(12) United States Patent
Arnao et al.

(10) Patent No.: US 8,111,331 B2
(45) Date of Patent: Feb. 7, 2012

(54) IMAGE RESIZER AND RESIZING METHOD (75) Inventors: Michael A. Arnao, Collegeville, PA (US); Joseph T. Friel, Ardmore, PA (US)

(73) Assignee: Cisco Technology, Inc., San Jose, CA (US)

( * ) Notice: Subject to any disclaimer, the term of this patent is extended or adjusted under 35 U.S.C. 154(b) by 1205 days.

(21) Appl. No.: 11/774,703

(22) Filed: Jul. 9, 2007

(65) Prior Publication Data
US 2009/0015717 A1    Jan. 15, 2009

(51) Int. Cl.
*H04N 9/74* (2006.01)
(52) U.S. Cl. ........ 348/581; 348/556; 348/445; 345/667; 345/668
(58) Field of Classification Search .......... 348/445, 348/458, 448, 556, 581, 582; 382/298, 299; 345/660, 667–671; 715/800, 801
See application file for complete search history.

(56) References Cited

U.S. PATENT DOCUMENTS

| 4,860,244 | A  | * | 8/1989  | Bruckert et al. | 711/219 |
| 6,801,674 | B1 |   | 10/2004 | Turney          | 382/298 |
| 2004/0213467 | A1 | * | 10/2004 | Tanaka et al. | 382/233 |
| 2007/0047828 | A1 | * | 3/2007  | Ishii et al.   | 382/232 |

OTHER PUBLICATIONS

Bellanger, M.; Bonnerot, G.; Coudreuse, M.;: "Digital filtering by polyphase network: Application to sample-rate alteration and filter banks," IEEE Transactions on Acoustics, Speech, and Signal Processing. vol. 24, No. 2, Apr. 1976, pp. 109-114.

P.P. Vaidyanathan, "Multirate digital filters, filter banks, polyphase networks, and applications: A tutorial," Proc. IEEE vol. 78, No. 1, pp. 56-93, 1990.

Robert D. Turney and Chris H. Dick: "Real Time Image Rotation and Resizing, Algorithms and Implementation," Xilinx, Inc., retrieved Jan. 3, 2007 at http://www.xilinx.com/products/logicore/dsp/rotation_resize.pdf.

Gockler H.G.1; Evangelista G.; Groth A.: "Minimal block processing approach to fractional sample rate conversion," Signal Processing, vol. 81, No. 4, Apr. 2001, pp. 673-691(19).

G. Bi, "Minimisation of delay requirements for rational sampling rate alternating systems," Proceedings of the Acoustics, Speech, and Signal Processing, 1991. ICASSP-91., pp. 1817-1820.

* cited by examiner

*Primary Examiner* — Michael Lee
(74) *Attorney, Agent, or Firm* — Dov Rosenfeld; Inventek (57) ABSTRACT

An apparatus embodiment is operative to scale video and includes an input buffer coupled to a real time source of video data and configured to hold a number of lines of video, a horizontal resizer coupled to the input buffer to resize lines of image data, outputting horizontally scaled line(s) to an intermediate buffer configured to store a number of lines. The apparatus has a vertical resizer coupled to the intermediate buffer configured to output vertically and horizontally resized lines of image data. At any given time, some of the lines in the input buffer are scheduled using the DMA controller for replacement via DMA by lines generated by the source of video data, and some or all of the remaining lines in the input buffer are available for processing by the horizontal resizer. A sufficient number of lines are available in the intermediate buffer, such that in operation, the intermediate buffer need not introduce latency.

15 Claims, 4 Drawing Sheets

IMAGE RESIZER AND RESIZING METHOD

FIELD OF THE INVENTION

The present disclosure relates generally to processing of digitized video data.

BACKGROUND

In real-time video applications such as videoconferencing, it is desirable to minimize system latency. A real-time image resizer such as a fractional decimator operative to resize each image of a sequence of images—a video stream—by scaling the number of horizontal picture elements (pixels) in a line and the number of lines in each digitized image by a not necessarily integer number is a typical component in a video signal processing chain. Such a fractional decimator requires buffering that adds latency to the video signal processing chain. For example, a known approach to fractional decimation is to process rows of data to horizontally resize using interpolation, and then resize the horizontally resized data in the vertical direction. Such a structure normally requires intermediate buffering, e.g., frame buffering, and normally has the latency of a full frame because vertical resizing cannot commence until all lines of the horizontal data have been resized.

Needing to avoid such intermediate frame buffering has been previously addressed. Robert D. Turney and Chris H. Dick: "Real Time Image Rotation and Resizing, Algorithms and Implementation," Xilinx, Inc., retrieved Jan. 3, 2007 at http://www.xilinx.com/products/logicore/dsp/rotation_re-size.pdf, and U.S. Pat. No. 6,801,674 to Turney of Xilinx, Inc., San Jose, Calif. describe an arrangement (The "Turney arrangement") wherein line buffers are used for storage of lines of pixel values for resizing. A first one of the line buffers receives input pixel values, and the line buffers are coupled in an ordered chain such that a line buffer receives pixel values from a previous line buffer in the ordering. The lines of pixel values are moved from one line buffer to the next line buffer as the pixel values are processed for resizing. For resizing, a vertical resizer, e.g., vertical decimator follows the line buffers, and a horizontal resizer, e.g., horizontal decimator follows the vertical resizer, e.g., vertical decimator. While the Turney arrangement is suitable for a chip, and in fact, the Turney article describes an FPGA (field programmable gate array) implementation, on a serial processor, the line buffers would be implemented as a FIFO (first in first out) buffer of lines of the input image width. The memory for such input can become large.

DESCRIPTION OF EXAMPLE EMBODIMENTS

Overview

Embodiments of the present invention include a method, an apparatus and logic encoded in one or more computer-readable tangible medium to carry out a method. The method is to resize image data corresponding to video frames by a fractional, not necessarily integer, resizing factor.

An image resizer, e.g., decimator is implemented as a cascade of horizontal and vertical polyphase resizers, e.g., decimators using a minimal amount of buffering in order to achieve sub-frame latency.

The resizer, e.g., decimator requires less memory and has lower latency, due to the reduced amount of buffering.

One embodiment includes an apparatus configured to scale video data in real time by a scaling factor that is a ratio of two integers. The apparatus includes a DMA controller, a real time source of video data of images of a number of lines of a number of pixels, an input buffer configured to hold a number of lines of video data generated by the source of video data, and a horizontal resizer coupled to the input buffer and configured to resize lines of image data from the input buffer and to output horizontally scaled lines of image data resized by a scaling factor expressible as a ratio of two integers. The apparatus further includes an intermediate buffer coupled to the output of the horizontal resizer and configured to store a number of horizontally scaled lines of image data, e.g., less than a complete image. The apparatus further includes a vertical resizer coupled to the intermediate buffer configured to vertically resize data from the intermediate buffer by the scaling factor, and an output buffer coupled to the output of the vertical resizer and configured to store horizontally and vertically resized lines of image data. At any given time, some of the lines in the input buffer are scheduled using the DMA controller for replacement via DMA by lines generated by the source of video data, and some or all of the remaining lines in the input buffer are available for processing by the horizontal resizer. A sufficient number of lines is available in the intermediate buffer, such that in operation, the intermediate buffer need not introduce latency.

One embodiment includes a method of scaling video data in real time by a scaling factor that is a ratio of two integers. The method comprises accepting into an input buffer a first number of lines from a source of video data, horizontally resizing a second number of lines from the input buffer by the scaling factor to generate horizontally resized lines, and storing the horizontally resized lines in an intermediate buffer. The method further includes vertically resizing a sufficient number of lines by the scaling factor to generate a line of vertically and horizontally resized image data. At any given time, some of the lines in the input buffer are scheduled for replacement via DMA by lines generated by the source of video data, and some or all of the remaining lines in the input buffer are available for the horizontal resizing. In operation, a sufficient number of lines are available in the intermediate buffer for the vertical resizing such that the intermediate buffer need not introduce latency.

One embodiment includes logic encoded in one or more tangible media for execution and when executed operable to scale video data in real time by a scaling factor that is a ratio of two integers, the scaling comprises accepting into an input buffer a first number of lines from a source of video data, horizontally resizing a second number of lines from the input buffer by the scaling factor to generate horizontally resized lines, and storing the horizontally resized lines in an intermediate buffer. The scaling further includes vertically resizing a sufficient number of lines by the scaling factor to generate a line of vertically and horizontally resized image data. At any given time, some of the lines in the input buffer are scheduled for replacement via DMA by lines generated by the source of video data, and some or all of the remaining lines in the input buffer are available for the horizontal resizing. In operation, a sufficient number of lines are available in the intermediate buffer for the vertical resizing such that the intermediate buffer need not introduce latency.

One embodiment includes a computer-readable carrier medium carrying a set of instructions that when executed by one or more processors cause the one or more processors to carry out a method of scaling video data in real time by a scaling factor that is a ratio of two integers. The method comprises accepting into an input buffer a first number of lines from a source of video data, horizontally resizing a second number of lines from the input buffer by the scaling factor to generate horizontally resized lines, and storing the horizontally resized lines in an intermediate buffer. The method further includes vertically resizing a sufficient number of lines by the scaling factor to generate a line of vertically and horizontally resized image data. At any given time, some of the lines in the input buffer are scheduled for replacement via DMA by lines generated by the source of video data, and some or all of the remaining lines in the input buffer are available for the horizontal resizing. In operation, a sufficient number of lines are available in the intermediate buffer for the vertical resizing such that the intermediate buffer need not introduce latency.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

An Embodiment of the Image Resizer

Figure 1:
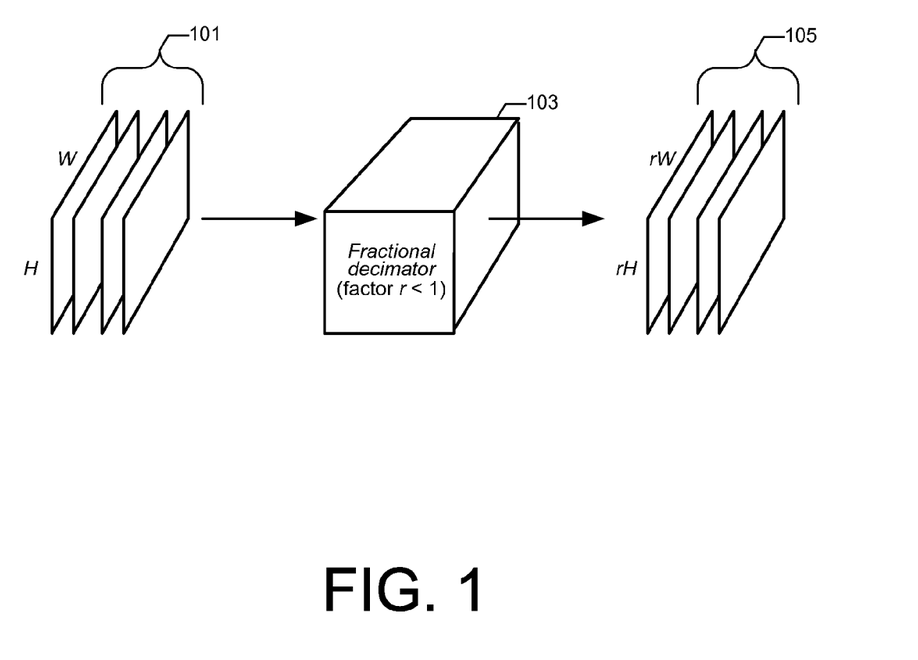
FIG. 1 shows a simplified block diagram of a source of video frames supplying frames of video to a real-time fractional decimator to generate resized video frames.

FIG. 1 shows a simplified block diagram of a source of video frames supplying frames of video to a real-time fractional decimator to generate resized video frames. In the description herein, as shown in FIG. 1, a source of video data provides video frames 101 of a first size, denoted as W pixels wide by H lines in height. An image resizer, e.g., decimator embodiment 103 of the invention is operable to resize, i.e., scale each frame in the spatial domain by a quantity denoted r and called the resizing factor. The resizing factor is not necessarily an integer number but is expressible as a ratio of an integer upsampling factor denoted L, and an integer downsampling factor denoted M. For fractional decimation, i.e., for reducing the size of an image, M>L. Thus r=L/M<1. Such an image resizer, e.g., decimator embodiment 103 outputs a stream of video frames 105 of width rW and height rH.

Figure 2:
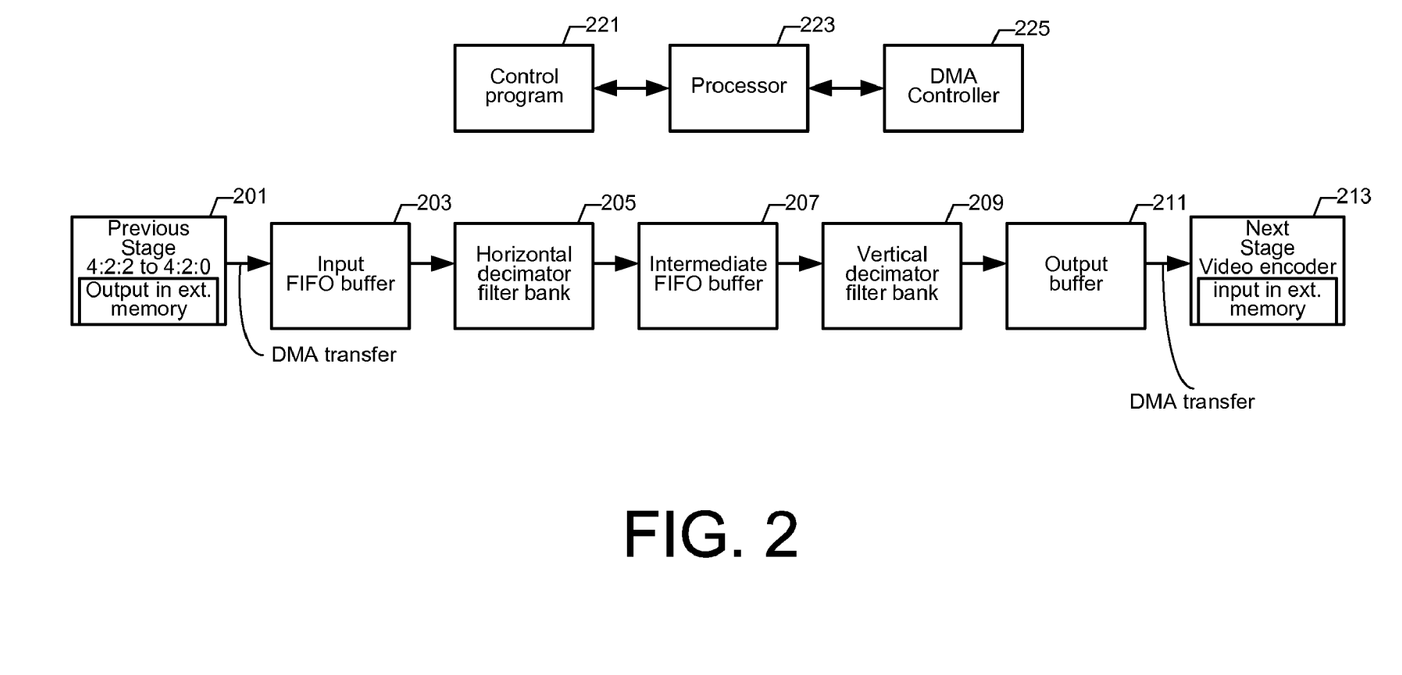
FIG. 2 shows one embodiment of an image resizer, e.g., decimator in the form of a simplified block diagram of a series connection of elements.

FIG. 2 shows one embodiment of an image resizer, e.g., decimator and includes a serial interconnection of the following elements: an input buffer 203, a horizontal resizer, e.g., horizontal decimator 205 in the form of a horizontal resizing filter bank, an intermediate buffer 207, a vertical resizer, e.g., vertical decimator 209 in the form of a vertical resizing filter bank, and an output buffer 211. These elements operate under overall control of a control process that in one embodiment is a control program 221 that is executed by a processor 223.

One embodiment of the input buffer 203 includes a first in first out (FIFO) buffer implemented as a circular buffer of a number of video lines of a width denoted W. In one embodiment, at any given time, some of the lines in the input buffer are scheduled by the control process using a Direct Memory Access (DMA) controller for replacement from a memory via background DMA from a previous stage 201 in the hardware, and some or all of the remaining lines are scheduled by the control process for processing by the horizontal resizer, e.g., horizontal decimator 205. The System includes a DMA controller 225 that is programmed by the control process to carry out the DMA transfers from a memory in the previous stage 201.

In one embodiment, the horizontal resizer 205 operates row-wise, across each line, and stores its results in the intermediate buffer 207. In one embodiment, the intermediate buffer 207 includes a FIFO buffer implemented as a circular buffer of horizontally resized, e.g., decimated video lines of width rW. The vertical resizing filter bank 209 is operative to process video lines from the intermediate buffer 207, and in one embodiment, operates column-wise, and stores its results in the output buffer 211. In one embodiment the output buffer 211 includes a double buffer of horizontally and vertically decimated video lines of width rW.

In one embodiment, at any given time, one line in the output buffer 211 is scheduled for replacement by the vertical resizer, e.g., vertical decimator, while the finished line is scheduled for transmission via background DMA to a next stage in the system (not shown).

Embodiments of the horizontal and vertical resizer, e.g., vertical decimators 205 and 209 are implemented using a polyphase structure. Such structures are known for use in such applications. See for example, Bellanger, M., Bonnerot, G., and Coudreuse, M.: "Digital filtering by polyphase network: Application to sample-rate alteration and filter banks," IEEE Transactions on Acoustics, Speech, and Signal Processing, vol. 24, No. 2, April 1976 pp. 209-114. See also P. P. Vaidyanathan, "Multirate digital filters, filter banks, polyphase networks, and applications: A tutorial," Proc. IEEE vol. 78, No. 1, pp. 56-93, 1990.

In the following example, fractional decimation is assumed, and those in the art will understand that creating a resizer that upconverts is straightforward from the description herein.

Polyphase Filter Banks

One method embodiment uses polyphase structures for the horizontal and vertical resizers. Using such structures include using a finite impulse response (FIR) lowpass filter of length L N, N an integer, with a cutoff frequency $\pi/M$, with the impulse response denoted by h[i]. For each of the horizontal and vertical resizers, the polyphase structure includes L polyphase FIR subfilters each having N coefficients.

For the horizontal polyphase structure, denote as $g_h[k_h, i]$, $k_h$ denoting the horizontal subfilter index; $0 \leq k_h < L$, i denoting the coefficient index, $0 \leq i < N$ as the N unnormalized coefficients of each of the L horizontal resizing polyphase FIR subfilters of the horizontal structure. The method includes determining the N unnormalized coefficients as:

$$g_h[k_h, i] = h[p_h[k_h] + Li], 0 \leq i \leq N,$$

where $$p_h[k_h] = (L-1) - (k_h M \bmod L).$$

The decimation method for the horizontal decimator includes computing the $m_h$-th output sample of the horizontal decimator using the $k_h$'th subfilter, where $m_h \geq 0$ and $k_h = m_h \bmod L$.

In one embodiment, to compute the $m_h$-th output sample, the $n_h[k_h]$ high-order taps of subfilter $k_h$ are aligned with the next $n_h[k_h]$ unprocessed horizontal decimator input samples, where $$n_h[k_h] = \text{int}(M(k_h+L)/L) - \text{int}(M(k_h+L-1)/L), 0 \leq k_h < L.$$

The remaining $N-n_h[k_h]$ taps are aligned with the $N-n_h[k_h]$ previous decimator input samples, such that an N-tap standard FIR filtering operation is performed. In on embodiment, the previous decimator input samples are all initialized to the first sample of the current line of input.

Similarly, for the vertical polyphase structure, denote as $g_v[k_v, i]$, $k_v$ denoting the vertical subfilter index; $0 \leq k_v < L$, $i$ denoting the coefficient index, $0 \leq i < N$ as the N unnormalized coefficients of each of the L vertical polyphase FIR subfilters of the vertical structure. The method includes determining the N unnormalized coefficients as:

$$g_v[k_v, i] = h[p_v[k_v] + Li], 0 \leq i \leq N,$$

where $$p_v[k_v] = (L-1) - (k_v M \bmod L).$$

The decimation method for the vertical decimator includes computing the $m_v$'th output sample of the vertical decimator using the $k_v$'th subfilter, where $m \geq 0$ and $k_v = m_v \bmod L$.

In one embodiment, to compute the $m_v$'th output sample, the $n_v[k_v]$ high-order taps of subfilter $k_v$ are aligned with the next $n_v[k_v]$ unprocessed vertical decimator input samples, where $$n_v[k_v] = \text{int}(M(k_v + L)/L) - \text{int}(M(k_v + L - 1)/L), 0 \leq k_v < L.$$

The remaining $N - n_v[k_v]$ taps are aligned with the $N - n_v[k_v]$ previous decimator input samples, such that an N-tap standard FIR filtering operation is performed. In one embodiment, the previous vertical decimator input samples are initialized to 0 in the case of luminance and 128 in the case of chrominance.

In one embodiment, if the decimator produces an output sample that is outside the appropriate range of amplitudes, e.g., [0, 255], the sample is clipped to that range.

One embodiment of the invention includes interleaving the horizontal and vertical decimation operations performed by the respective horizontal and vertical polyphase filter operations such that input-to-output latency is reduced compared to a straightforward prior art serial implementation that would require one frame of latency. One such prior art implementation would have a frame buffer between the horizontal and vertical decimators, while in the present invention, a circular buffer implementing a FIFO buffer is used. In one embodiment of the present invention, the buffer between the horizontal filter bank and the vertical filter bank is a circular buffer (FIFO) that does not introduce any latency: if the vertical decimator at a given point in the processing requires a certain number of lines, say, for example, three new horizontally decimated lines, the horizontal decimator will process three lines and output the results into the intermediate, e.g., circular buffer, and the vertical decimator will then immediately use the contents of the intermediate, e.g., circular buffer to produce the next line of output. In this particular illustrative example, the three lines would be vertically decimated to one line, with the only latency occurring at the horizontal decimator's input buffer in waiting for the three lines of input.

Figure 3:
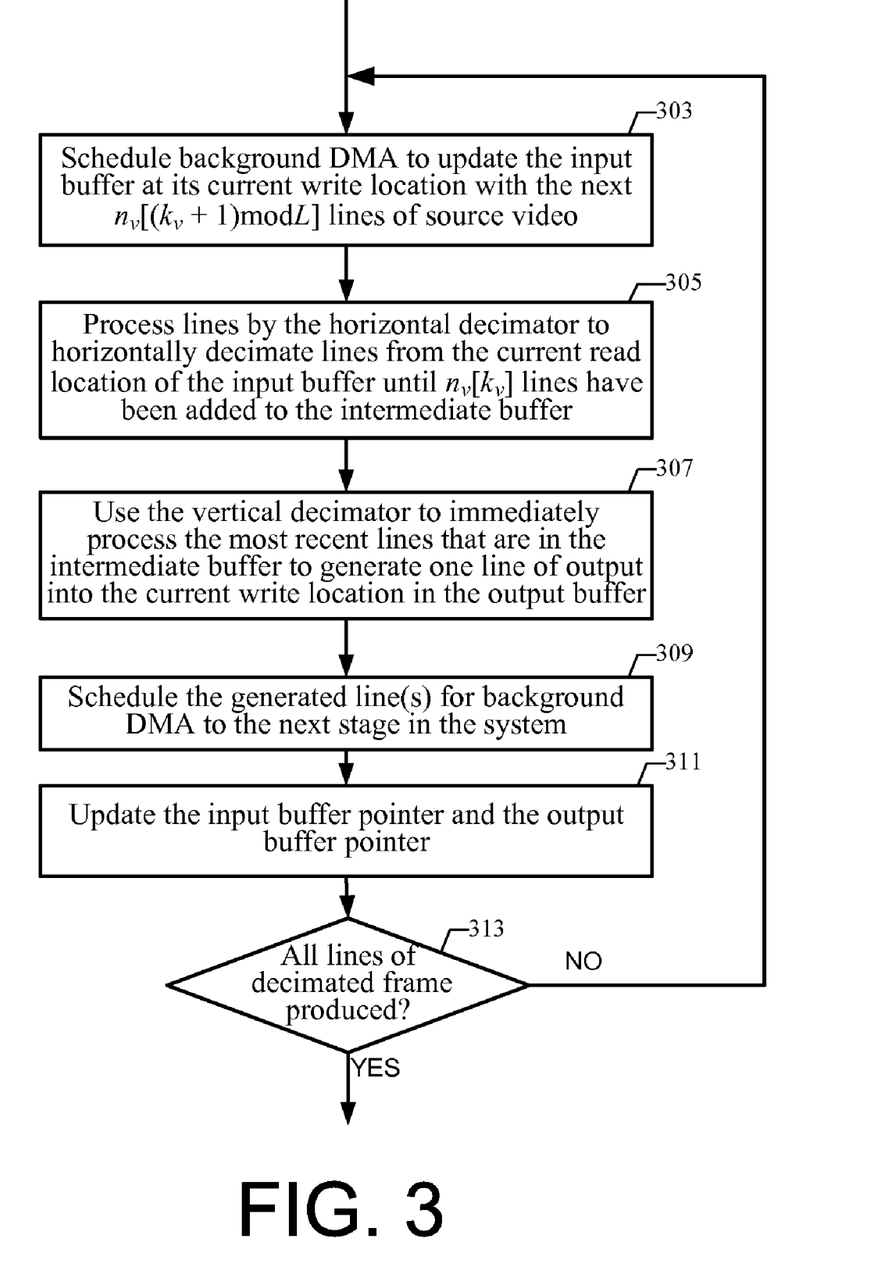
FIG. 3 shows a simplified flowchart of a method embodiment of sizing a frame of image data.

Denote by $k_v$ the current vertical subfilter index. For a given frame, FIG. 3 shows a flowchart of the operations performed. 303 includes scheduling background DMA to update the input buffer 203 at its current write location with the next $n_v[(k_v+1) \bmod L]$ lines of source video. 305 includes processing lines by the horizontal decimator 205 to horizontally decimate lines from the current read location of the input buffer 203 until $n_v[k_v]$ lines have been added to the intermediate buffer 207. In 307, the vertical decimator 209 immediately processes the most recent N lines in the intermediate buffer 207 to generate one line of output into the current write location in the output buffer 211. In 309, that generated line is scheduled for background DMA to the next stage 213 in the system. 311 includes updating the input buffer pointer and the output buffer pointer. 313 indicates that the loop 303, 305, 307, 309, and 311 is repeated until all lines of the decimated frame have been produced.

At the start of a frame, one embodiment includes an initial DMA of the first n[0] lines of source video into the input buffer 203.

In one embodiment, in conformance with the efficient double buffering scheme, the input buffer is designed to have capacity for at least as many lines as are required to provide new input samples to any two consecutive subfilters of the vertical decimator, following the horizontal decimation.

In one embodiment, the length of the input buffer 203, in lines is selected to be:

$$\max(n_v[k_v \bmod L] + n_v[(k_v+1) \bmod L]), 0 \leq k_v \leq L.$$

In an alternate embodiment, in order to allow for simpler input buffer logic, the length of the input buffer is selected to be:

$$2\max(n_v[k_v]), 0 \leq k_v < L.$$

The alternate embodiment while using more memory, is justified in some circumstances for its ability to use simpler input buffer logic. In such an implementation, for a given upsampling factor, both buffers of the double buffer have the same length.

In one implementation, the length of the intermediate buffer 207 in lines is N, the polyphase subfilter length.

It should be noted that in one embodiment, the intermediate buffer 207 introduces no latency; it holds the current state of the vertical subfilters.

The Input Buffer

In a video signal processing system that incorporates a decimator, a source process 201 provides the source video to the decimator. In this implementation, the source process controls a write pointer, $B_{wr}$, which points into a circular buffer, B (included in, or being the whole input buffer), of length $L_B$ video samples. The buffer B and pointer $B_{wr}$ both reside in shared memory that is accessible by both the source process and the decimator. The pointer $B_{wr}$ contains the address within buffer B at which the current line of source video is being written. Decimator input buffer logic is configured to control a read pointer, $B_{rd}$, which contains the address within the buffer B from which the next line of source video is to be read. When the decimator requires a DMA into the input buffer to transfer the next n[k] lines of source video, the input buffer logic polls the pointer $B_{wr}$ until the pointer $B_{wr}$ is outside the range $[B_{rd}, B_{rd}+n W)$ wrapped to $[B, B+L_B)$, recalling that W denotes the width in pixels of the picture. When that condition is true, indicating all n[k] requested lines are ready, the DMA transfer is scheduled, and $B_{rd}$ is incremented by n W and is wrapped to $[B, B+L_B)$. The pointers $B_{wr}$ and $B_{rd}$ are initialized to the address of the buffer B at the start of each frame, which is signalled by the source process through a flag, called start_of_frame, which also resides in the shared memory.

This invention applies to both monochrome and color video. In the case of color video, each color component (e.g., Y, Cr, and Cb, or Y', Cr, and Cb also called YUV) is decimated as described above.

In one embodiment, the previous process 201 is a down-conversion of high definition video from 4:2:2 Y'CrCb (also called 4:2:2 YUV) format to 4:2:0 Y'CrCb (also called 4:2:0 YUV) format, and in one embodiment, the next process 213 is a video encoder to compress the resized 4:2:0 video, e.g., using ITU-T H.264/AVC coding to some other video coding method. Thus, in one embodiment, there are at least 1200 pixels, e.g., 1920 pixels per line, and there are at least 700 lines per image, e.g., 720 lines of video data, or in another embodiment, 1080 lines of video data. One embodiment works in real time with data that is selectable to be 1080p, 1080i or 720p data.

Note that in the embodiment described herein, the state of the horizontal filter is initialized at the start of each line, and the state of the vertical filter is initialized at the start of each frame. The state of the horizontal filter is contained in the horizontal filter taps and the state of the vertical filter is contained in the intermediate buffer. The simple initialization method described hereinabove is one simple method, and in alternate methods, other alternate methods can be used to initialize the filter states.

An Example of a Source of Video Data

Figure 4:
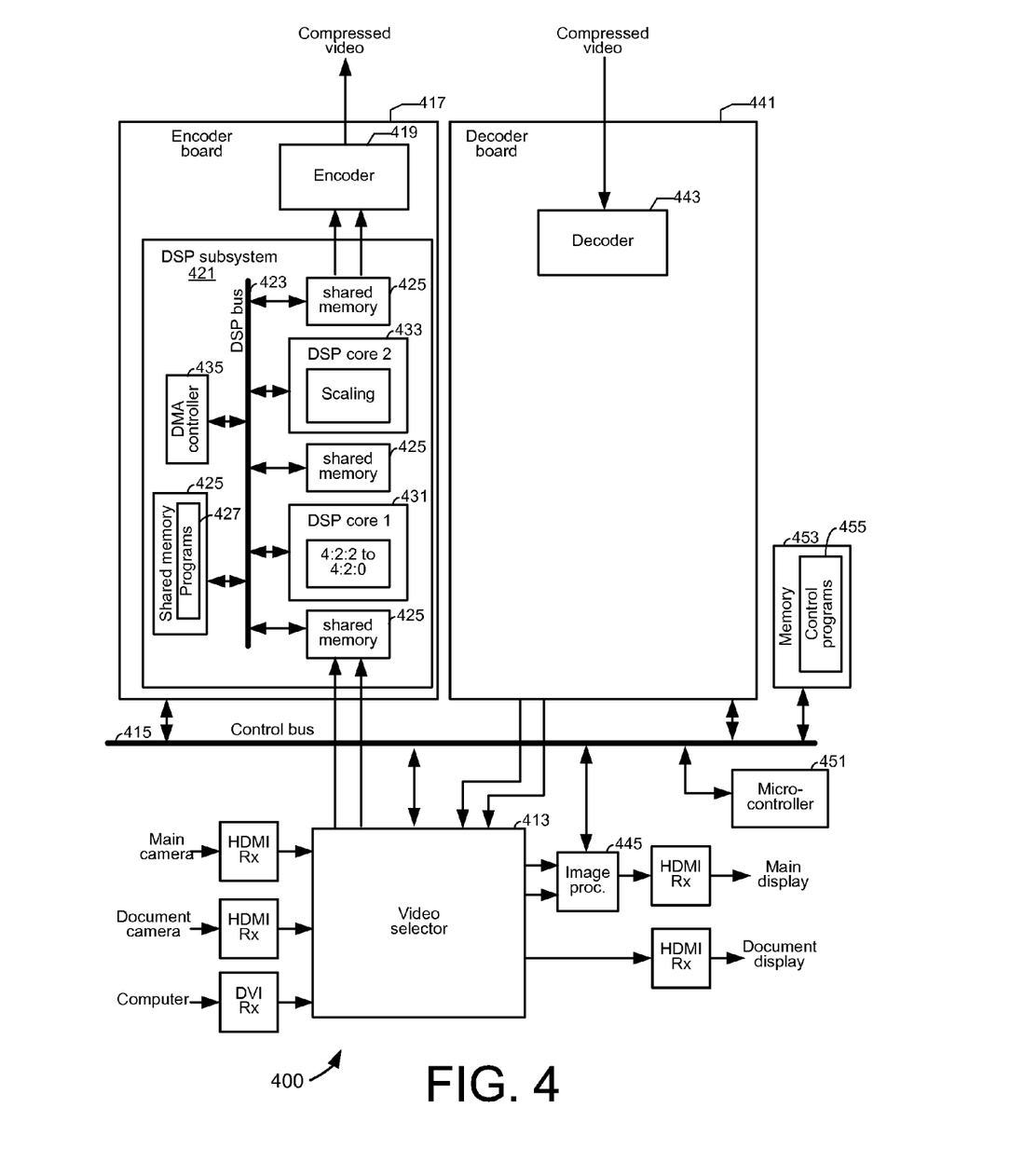
FIG. 4 shows a simple block diagram of an apparatus used for video processing in a terminal of a videoconferencing system and that includes an embodiment of the present invention.

FIG. 4 shows a simple block diagram of an apparatus 400 that includes an embodiment of the present invention. The apparatus 400 of FIG. 4 is used for video processing in a terminal of a videoconferencing system in which compressed video is sent and received to and from a network, and in which locally generated video is accepted. A display part displays the video corresponding to signals received via the network and signals generated locally, e.g., from one or more cameras. The invention, however, is not limited to such contexts and applications.

In apparatus 400 of FIG. 4, at least a main camera, and optionally a document camera or a computer or both are used, and each is coupled to a respective first HDMI (High Definition Multimedia Interface) receiver and second HDMI receiver for the main and document cameras, and a DVI (Digital Video Interface) receiver for the computer source when used. The respective HDMI or DVI receivers are operative to convert the HDMI or DVI serial bit streams to parallel video signals. In one embodiment, the video stream from the main camera is a 16-bit 4:2:2 Y'CrCb (also called 4:2:2 YUV) high definition format that is selectable to be 1080p, 1080i or 720p or some other format. The document camera in one embodiment is in 24-bit RGB high definition format that is also is selectable to be 1080p, 1080i or 720p or some other format. Similarly, the DVI input from the computer produces, in one embodiment, 24-bit RGB video data.

Note that in some embodiments, one or more of the cameras and/or computer sources are in analog form, and in such embodiments, such analog signal(s) is/are digitized.

A video selector unit 413, in one embodiment in the form of an FPGA, is operative to direct various video signals to and from elements of the apparatus. One embodiment also includes a multiplexer (not separately shown). The video selector 413 is coupled to a control bus 415 and controlled from a microcontroller 451 that is coupled to the control bus. A memory 453 is shown containing software 455 (shown as "Programs") that is operative when executed by the microcontroller 451, together with the hardware, to control operation of the system. Note that in some embodiments, some of the software 455 may be in a built-in memory in the microcontroller. Furthermore, in some embodiments, a processing system containing one processor or more than one processors may replace the microcontroller.

Note also that in order not to obscure details, various segments of the control bus are shown separately, and furthermore, the bus is shown as a single bus. Those in the art will understand that modern bus subsystems are more complex.

The three video inputs are in one embodiment, directed to a high definition video encoder board 417 that includes an encoder 419 to encode the video signals to produce compressed video data to be sent via a network. In one embodiment, two video sources are encoded, the main camera first high definition video source from the first HDMI receiver and a selected one of the second high definition video sources from the second HDMI receiver from the document camera or the video source from the computer. The video encoder board 417 is coupled to the control bus and controlled by the microcontroller 451. One embodiment also includes output to the control bus for reading one or more registers in the encoder.

A video decoder board 441 includes a decoder 443 that is operative to decode compressed video data, e.g., that arrives from the computer network and transfers two streams of video data to the video selector 413. One of the decoder outputs is a decoded main camera output, and the other a secondary output. The video decoder board 441 is coupled to the control bus 415 and controlled by the microcontroller 451 that is coupled to the control bus.

In addition to the two streams from the decoder board 441, the video selector 413 also accepts an input stream from the local main camera via the first HDMI receiver for output to local displays. The video selector 413 then selects two of the three inputs, e.g., the decoded main camera output and local main camera output from the first HDMI receiver, and transfers them to an image processing unit 445 that is operative in conjunction with the selector 413 to process the two input streams and combine them with an on-screen display and perform functions such as one or more of rate conversions, picture-in-picture (PIP), picture-on-picture (POP), picture-by-picture (PBP) and on-screen-display (OSD) for a local display. The output of the image processing unit 445 is forwarded to a local display, via an HDMI transmitters in one embodiment. The decoder board 441 in one version also supplies a second video output which is that of either a decoded document camera or a computer source video from the decoder 443.

To not distract from the main inventive aspects, not shown are various elements such as a memory for the image processor 445, a video input clock, and so forth.

One implementation of the present invention is for scaling in the encoder board 417. For such scaling, one embodiment of the encoder board includes a DSP subsystem 421 comprising a dual-processor (dual core) DSP device that includes a first core 431 and second core 433, shared memory 425, and a DMA controller 435 coupled via a DSP bus subsystem 423 shown here for simplicity as a single bus. DMA controller 435 acts as the DMA controller 225 of FIG. 2. The shared memory 425 include instructions—shown as part of "Programs" 427—operative when executed to implement one or more method steps of a method embodiment of the invention. Thus, control program 221 of FIG. 2 in one embodiment is in Programs 427. The Processor 223 of FIG. 2 in one embodiment is implemented by one of the core processors of the DSP device in the DSP subsystem. In one embodiment, the DSP device is a Blackfin™ Dual-Core device from Analog Devices, Inc., Norwood, Mass. Of course the invention may be implemented by various alternate processing systems, whether or not such systems are called DSP devices, and also by other hardware or software.

In one embodiment, high definition 4:2:2 Y'CrCb video from the main camera is first converted from 4:2:2 Y'CrCb to 4:2:0 Y'CrCb video. For this, the shared memory includes instructions operative when executed to cause the first DSP core 431 to convert 4:2:2 video in a first buffer, which in one embodiment is in shared memory 425, to 4:2:0 Y'CrCb video in a second buffer also part of shared memory 425. The second buffer acts as the buffer B described herein above. The DMA controller 435 in one embodiment is operative to cause video lines to be accessed via DMA control from the second buffer B in shared memory 425. Instructions corresponding to control program 221 in Programs 425 when executed cause the second DSP core 433 to carry out the processing shown in FIG. 2. The DMA controller 435 is configured to cause resized video to be transferred to a buffer in shared memory 425 for output to the encoder 419.

The type of scaling depends on the input format and on the output format that is being encoded by the encoder 419. In one embodiment, the scaling factor is settable by the microcontroller 451.

Returning again to FIG. 2, it should be noted that some latency in the chain can arises in the input buffer 203 that precedes the horizontal decimator 205. For the videoconferencing application described in FIG. 4, the input buffer 203 can contain a relatively small number of input lines. For example, 3 to 6 lines for one implementation, for the scaling factors implemented for the videoconferencing application. The inventors have found that the latency is about half the length of the input buffer—only a few video lines' worth, and far less than the latency introduced in implementations that have a frame buffer between the horizontal and vertical decimators.

In one embodiment, a computer-readable carrier medium carries a set of instructions that when executed by one or more processors of a image resizer, e.g., DSP cores, cause the one or more processors to carry out a method in the image resizer of resizing an image in real time.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be includes in a computer program product.

In alternative embodiments, the one or more processors operate as a standalone device or may be coupled, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of an image resizer. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Description of Example Embodiments are hereby expressly incorporated into this Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

It should further be appreciated that although the invention has been described in the context of H.264/AVC, the invention is not limited to such contexts and may be utilized in various other applications and systems, for example in a system that uses the Chinese-initiated AVS system Draft of Advanced Audio Video Coding—Part 2: Video, AVS-N1063, 2003. Microsoft's Windows Media Video 9, the VC-1 SMPTE standard, MPEG1, MPEG2, or other compressed media streams, whether or not conforming to a standards. Furthermore, the invention is not limited to any one type of network architecture and method of encapsulation, and thus may be utilized in conjunction with one or a combination of other network architectures/protocols.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus configured to scale video data in real time by a scaling factor that is a ratio of two integers, the apparatus comprising:
   a DMA controller;
   a real time source of video data of images of a number of lines of a number of pixels;
   an input buffer configured to hold a number of lines of video data generated by the source of video data;
   a horizontal resizer coupled to the input buffer and configured to resize lines of image data from the input buffer and to output horizontally scaled lines of image data resized by a scaling factor expressible as a ratio of two integers;
   an intermediate buffer coupled to the output of the horizontal resizer, configured to store a number of horizontally scaled lines of image data;
   a vertical resizer coupled to the intermediate buffer configured to vertically resize data from the intermediate buffer by the scaling factor; and
   an output buffer coupled to the output of the vertical resizer and configured to store horizontally and vertically resized lines of image data,
   wherein at any given time, some of the lines in the input buffer are scheduled using the DMA controller for replacement via DMA by lines generated by the source of video data, and some or all of the remaining lines in the input buffer are available for processing by the horizontal resizer, and wherein a sufficient number of lines are available in the intermediate buffer for processing by the vertical resizer, and
   wherein horizontal resizing operations and vertical resizing operations performed respectively by the horizontal resizer and the vertical resizer are interleaved such that in operation, the intermediate buffer need not introduce latency.

2. An apparatus as recited in claim 1, wherein at any given time, a line in the output buffer is scheduled for replacement by the vertical resizer, while a horizontally and vertically resized line in the output buffer is scheduled for transmission via DMA from the output buffer to a next stage.

3. An apparatus as recited in claim 1, wherein the horizontal resizer includes a bank of horizontal subfilters, and wherein the vertical resizer includes a bank of vertical subfilters.

4. An apparatus as recited in claim 1, wherein the horizontal resizer includes a bank of horizontal subfilters, wherein the vertical resizer includes a bank of vertical subfilters, and wherein the input buffer is designed to have a capacity for at least as many lines as are required to provide new input samples to any two consecutive vertical subfilters of the vertical resizer following the horizontal resizing.

5. An apparatus as recited in claim 3, wherein the input buffer is implemented as a circular buffer arranged as a first in first out buffer that need be no longer than the maximum number of input values needed by a present vertical subfilter and the next to the present vertical subfilter of the vertical resizer.

6. A method comprising:
   accepting into an input buffer a first number of lines from a source of video data;
   horizontally resizing a second number of lines from the input buffer by a scaling factor that is expressible as a ratio of two integers to generate horizontally resized lines;
   storing the horizontally resized lines in an intermediate buffer; and
   vertically resizing a sufficient number of lines by the scaling factor to generate a line of vertically and horizontally resized image data,
   wherein at any given time, some of the lines in the input buffer are scheduled for replacement via DMA by lines generated by the source of video data, and some or all of the remaining lines in the input buffer are available for the horizontal resizing, and further, a sufficient number of lines are available in the intermediate buffer for the vertical resizing, and
   wherein the horizontal resizing and the vertical resizing are interleaved, such that in operation, the intermediate buffer need not introduce latency.

7. A method as recited in claim 6, wherein the lines of vertically and horizontally resized image data are input into an output buffer, the method further comprising scheduling DMA transfer of one or more lines from the output buffer to a next stage process, such that at any given time, a line in the output buffer is scheduled for replacement by the vertical resizer, while a horizontally and vertically resized line in the output buffer is scheduled for transmission via DMA from the output buffer to a next stage.

8. A method as recited in claim 6, wherein the horizontal resizing includes applying a plurality of horizontal filter operations according to a bank of horizontal subfilters, wherein the vertical resizing includes applying a plurality of vertical filter operations according to a bank of vertical subfilters.

9. A method as recited in claim 6, wherein video data includes images of at least 700 lines of at least 1200 pixels in width, and wherein the method is carried out in real time.

10. A method as recited in claim 6, wherein the horizontal resizing includes applying a plurality of horizontal filter operations according to a bank of horizontal subfilters, wherein the vertical resizing includes applying a plurality of vertical filter operations according to a bank of vertical subfilters, and wherein the input buffer is designed to have a capacity for at least as many lines as are required to provide new input samples to any two consecutive vertical subfilters of the vertical resizing following the horizontal resizing.

11. A method as recited in claim 8, wherein the input buffer is implemented as a circular buffer that need be no longer than the maximum number of input values needed by a present vertical subfilter and the next to the present vertical subfilter of the vertical resizer.

12. A method as recited in claim 8,
   wherein the accepting of the first number of lines is by DMA, and is of the next $n_v[(k_v+1) \mod L]$ lines of video, $k_v$ denoting the present vertical subfilter of the vertical resizing, $0 \leq k_v < L$, such that $k_v+1$ denotes the next subfilter, and wherein the scaling factor is L/M, L and M integer values; while the horizontal resizing is of a number $n_v[k_v]$ lines, such that $n_v[k_v]$ are available in the intermediate buffer for the vertical resizing, and such that the input buffer need not be larger than needed to hold the maximum of $\{n_v[(k_v+1) \bmod L]\}$ lines of data, $0 \leq k_v \leq L$.

13. A method as recited in claim 8, wherein the length of the input buffer is at least twice the largest value of $(n_v[k_v])$, $0 \leq k_v < L$.

14. A computer-readable hardware storage medium encoded with a set of instructions that when executed by one or more processors cause the one or more processors to carry out a method of scaling video data in real time by a scaling factor that is a ratio of two integers, the scaling method comprising:

accepting into an input buffer a first number of lines from a source of video data;

horizontally resizing a second number of lines from the input buffer by a scaling factor that is expressible as a ratio of two integers to generate horizontally resized lines;

storing the horizontally resized lines in an intermediate buffer; and vertically resizing a sufficient number of lines by the scaling factor to generate a line of vertically and horizontally resized image data, wherein at any given time, some of the lines in the input buffer are scheduled for replacement via DMA by lines generated by the source of video data, and some or all of the remaining lines in the input buffer are available for the horizontal resizing, and further, a sufficient number of lines are available in the intermediate buffer for the vertical resizing, wherein the horizontal resizing and the vertical resizing are interleaved, such that in operation, the intermediate buffer need not introduce latency.

15. A computer-readable hardware storage medium as recited in claim 14, wherein the horizontal resizing includes applying a plurality of horizontal filter operations according to a bank of horizontal subfilters, wherein the vertical resizing includes applying a plurality of vertical filter operations according to a bank of vertical subfilters.

* * * * *